(12) United States Patent
Kim et al.

(10) Patent No.: US 9,540,004 B2
(45) Date of Patent: Jan. 10, 2017

(54) VEHICLE CONTROL SYSTEM

(75) Inventors: Jonggap Kim, Hadano (JP); Yasuyuki Kato, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/406,748

(22) PCT Filed: Jun. 20, 2012

(86) PCT No.: PCT/JP2012/065698
§ 371 (c)(1),
(2), (4) Date: Dec. 9, 2014

(87) PCT Pub. No.: WO2013/190652
PCT Pub. Date: Dec. 27, 2013

(65) Prior Publication Data
US 2015/0149058 A1    May 28, 2015

(51) Int. Cl.
*B60W 30/14* (2006.01)
*F16D 48/06* (2006.01)
*B60W 30/18* (2012.01)

(52) U.S. Cl.
CPC ............ *B60W 30/143* (2013.01); *F16D 48/06* (2013.01); *F16D 2500/10412* (2013.01);
(Continued)

(58) Field of Classification Search
CPC .................... B60W 30/143; B60W 30/18072; B60W 2030/1809; F16D 48/06
See application file for complete search history.

(56) References Cited

U.S. PATENT DOCUMENTS 5,961,418 A    10/1999    Taniguchi et al.
8,394,001 B2    3/2013    Tsutsui et al.
(Continued)

FOREIGN PATENT DOCUMENTS

CN    102476633 A    5/2012
JP    8-285074    11/1996
(Continued)

OTHER PUBLICATIONS

Office Action issued in U.S. Appl. No. 14/414,593 on Apr. 8, 2016.

*Primary Examiner* — Basil T Jos
(74) *Attorney, Agent, or Firm* — Finnegan, Henderson, Farabow, Garrett & Dunner, LLP (57) ABSTRACT

A vehicle control system is provided. The vehicle control system is applied to a vehicle having a clutch device adapted to selectively connect and disconnect a power transmission route between a prime mover and drive wheels. The vehicle control system disconnects the power transmission route during running to allow the vehicle to coast. The vehicle control system is comprised of: a means detecting a vehicle speed; a means detecting an operation of an accelerator by a driver; a means detecting a braking operation of the driver; an execution means executing a coasting control when an operating amount of the accelerator is reduced to be smaller than a predetermined value during running, by bringing the clutch device into disengagement to disconnect the power transmission route so as to allow the vehicle to coast; a determination means determining whether or not a deceleration demand of the driver is larger than a predetermined value during execution of the coasting control based on the vehicle speed and the braking operation; and a termination means determining a fact that the deceleration demand is strong if the deceleration demand is larger than the predetermined value, and that terminates the coasting control by
(Continued)

bringing the clutch device into engagement to connect the power transmission route.

10 Claims, 6 Drawing Sheets

(52) U.S. Cl.
CPC .............. *F16D 2500/3108* (2013.01); *F16D 2500/3127* (2013.01); *F16D 2500/3128* (2013.01); *F16D 2500/31433* (2013.01); *F16D 2500/31453* (2013.01); *F16D 2500/5043* (2013.01); *F16D 2500/5085* (2013.01); *F16D 2500/50825* (2013.01)

(56) References Cited

U.S. PATENT DOCUMENTS

| | | | |
|---|---|---|---|
| 2007/0102208 A1 | 5/2007 | Okuda et al. | |
| 2011/0245005 A1 | 10/2011 | Tsutsui et al. | |
| 2012/0010047 A1 | 1/2012 | Strengert et al. | |
| 2012/0135839 A1* | 5/2012 | Watanabe | B60W 30/18072 477/110 |
| 2012/0220424 A1* | 8/2012 | Staudinger | B60W 30/16 477/80 |
| 2015/0006045 A1 | 1/2015 | Motozono et al. | |
| 2015/0149058 A1 | 5/2015 | Kim et al. | |
| 2015/0166065 A1 | 6/2015 | Kuroki et al. | |
| 2015/0191172 A1 | 7/2015 | Kim | |
| 2015/0274168 A1 | 10/2015 | Kuroki et al. | |
| 2015/0291171 A1 | 10/2015 | Kuroki et al. | |
| 2015/0307103 A1 | 10/2015 | Kuroki et al. | |
| 2016/0084376 A1 | 3/2016 | Kim et al. | |

FOREIGN PATENT DOCUMENTS

| | | |
|---|---|---|
| JP | 10-181388 | 7/1998 |
| JP | 2001-221341 | 8/2001 |
| JP | 2002-227885 | 8/2002 |
| JP | 2005-226701 | 8/2005 |
| JP | 2010-60010 | 3/2010 |
| JP | 2011-21702 | 2/2011 |
| JP | 2011-117497 | 6/2011 |
| JP | 2011-144878 | 7/2011 |
| JP | 2011-219087 | 11/2011 |
| JP | 2012-36912 | 2/2012 |
| WO | WO 2011/054621 A1 | 5/2011 |

* cited by examiner

VEHICLE CONTROL SYSTEM

CROSS REFERENCE TO RELATED PATENT APPLICATIONS

This application is a national phase of International Application No. PCT/JP2012/065698, filed on Jun. 20, 2012, which is incorporated herein in its entirety by reference.

TECHNICAL FIELD

The present invention relates to a control system for a vehicle that is provided with a clutch device for selectively connect and disconnect a prime mover to/from drive wheels through a power transmission route, and that is allowed to coast by bringing the clutch device into disengagement.

BACKGROUND ART

In order to improve fuel economy, a fuel cut-off control for stopping fuel supply to an engine during running, and a coasting control for coasting the vehicle by disconnecting the engine from a drive line during running have been employed in recent years. Specifically, the fuel cut-off is carried out to stop fuel supply to the engine given that an accelerator is returned to close an accelerator valve completely, and that an engine speed is higher than an idling speed so that a vehicle speed is higher than a predetermined speed. Under the fuel cut-off control, although the combustion of fuel in the engine is stopped, the engine is still rotating by a torque from the drive wheels. Therefore, a braking torque resulting from a pumping loss of the engine and a friction torque is applied to the drive wheels. Consequently, an engine braking force is applied to the vehicle.

For example, the coasting control is carried out when the accelerator is returned during running to coast the vehicle without rotating the engine passively by bringing the clutch into disengagement disposed between the engine and the drive wheels. Therefore, under the coasting control, the engine braking force will not be applied to the vehicle so that the vehicle is allowed to coast utilizing an inertia energy.

The coasting control may be carried out not only by stopping the fuel supply to the engine but also without stopping the fuel supply to the engine while lowering the engine speed close to the idling speed. In case of carrying out the coasting control while stopping the engine, the fuel will not be consumed during coasting the vehicle so that the fuel economy can be improved significantly. By contrast, in case of carrying out the coasting control without stopping the engine, the fuel economy will not be improved as the case of stopping the engine. In this case, however, it is not necessary to arrange additional devices for insuring a required oil pressure under cessation of the engine such as an electric oil pump, a hydraulic accumulator etc. Therefore, the coasting control can be carried out easily without requiring additional modification of the vehicle and additional equipment. In the following explanation, the coasting control without stopping the engine will be called the "neutral coasting control" or the "N coasting control".

For example, Japanese Patent Laid-Open No. 2011-117497 describes a controller for a vehicle driving device configured to carry out the coasting control. The controller taught by Japanese Patent Laid-Open No. 2011-117497 is applied to a vehicle driving device comprised of an engine and an electromagnetic clutch disposed, on a power transmission route between the engine and drive wheels to selectively provide a connection therebetween. According to the teachings of Japanese Patent Laid-Open No. 2011-117497, a power transmission between the engine and the drive wheels is cut-off by the electromagnetic clutch given that an engine braking force exceeds a driving force propelling the vehicle established by operating an accelerator. Japanese Patent Laid-Open No. 2011-117497 further describes a fact that the engine and the drive wheels is connected by increasing a torque transmission capacity of the electromagnetic clutch at a predetermined ratio with respect to an elapsed time, given that a brake is depressed during interrupting the power transmission therebetween.

Japanese Patent Laid-Open No. 2002-227885 describes a clutch control device comprised of a clutch disposed on a power transmission route between an engine and drive wheels, and a control valve for actuating the clutch. The control device is configured to allow the vehicle to coast by opening the clutch by the control valve. According to the teachings of Japanese Patent Laid-Open No. 2002-227885, the coasting mode is cancelled if a brake pedal is depressed by a pressure greater than a predetermined pressure, if a distance from a forerunning vehicle shorter than a predetermined distance, or if a vehicle speed exceeds an upper limit speed or falls below a lower limit speed. Japanese Patent Laid-Open No. 2002-227885 further discloses to adjust an engine speed during the coasting mode in a manner such that a speed difference of the clutch is reduced to be lower than a predetermined value, and to temporarily interrupt such control for reducing the speed difference of the clutch when cancelling the coasting mode.

Japanese Patent Laid-Open No. 2010-60010 describes a control device for automatic transmission. According to the teachings of Japanese Patent Laid-Open No. 2010-60010, a power transmission between an engine and drive wheels is selectively interrupted by a clutch, and a vehicle speed is maintained to a constant speed during running down a downslope. When the vehicle runs down a slope where a downgrade is smaller than a set value, a sliding fastening control of the clutch is executed without altering a speed ratio. In this case, if the downgrade of the slope exceeds the set value, the vehicle speed is maintained to a constant speed.

Japanese Patent Laid-Open No. 2011-144878 describes a hydraulic control device for vehicular transmission comprising a hydraulic engagement device. The hydraulic engagement device is adapted to transmit an engine power to drive wheels when engaged, and provided with a cushion plate as a spring member interposed between a frictional engagement element and a pushing portion of the piston. In order to reduce an idling load of the engine, the hydraulic control device executes a neutral control upon satisfaction of a predetermined condition, by causing the engagement device to slip or bringing the engagement device into disengagement thereby restricting a power transmission between the engine and the drive wheels. Japanese Patent Laid-Open No. 2011-144878 further discloses to temporarily hold an engagement, pressure of the engagement device when cancelling the coasting control at a standby pressure to be applied to the cushion plate to push the cushion plate.

The controller taught by Japanese Patent Laid-Open No. 2011-117497 is configured to connect the power transmission route between the engine and the drive wheels to terminate the coasting upon activation of the brake device during coasting the vehicle while disconnecting the power transmission route. According to the teachings of Japanese Patent Laid-Open No. 2011-117497, therefore, the vehicle is decelerated not only by a braking force generated by depressing a brake pedal but also by an engine braking force resulting from a pumping loss and a friction torque. For this reason, the vehicle can be decelerated promptly in line with the driver's intension.

However, fuel economy may be reduced if the coasting is terminated based on an operation of the brake device during the coasting as taught by Japanese Patent Laid-Open No. 2011-117497. Basically, the deceleration demanded by the driver by depressing the accelerator pedal differs depending on a vehicle speed. Therefore, if the coasting control is terminated based only on an operation of the brake device, the coasting control may be terminated in spite of the fact that the driver does not intends to decelerate the vehicle significantly. In this case, fuel economy to be achieved by the coasting control would be reduced. In addition, the vehicle may be decelerated more than expected and the vehicle has to be accelerated unnecessarily. Consequently, the fuel economy of the vehicle would be further reduced.

DISCLOSURE OF THE INVENTION

The present invention has been conceived noting the foregoing technical problems, and it is therefore an object of the present invention is to provide a vehicle control system configured to carry out a coasting control in efficient manner while interrupting a power transmission between an engine and drive wheels.

The vehicle control system of the present invention is applied to a vehicle having a clutch device adapted to selectively connect and disconnect a power transmission route between a prime mover and drive wheels, and the vehicle control system is configured to disconnect the power transmission route during running to allow the vehicle to coast. In order to achieve the above-explained objectives, according to the present invention, the vehicle control system is provided with: a means that detects a vehicle speed; a means that detects an operation of an accelerator by a driver; a means that detects a braking operation of the driver; an execution means that executes a coasting control when an operating amount of the accelerator is reduced to be smaller than a predetermined value during running, by bringing the clutch device into disengagement to disconnect the power transmission route so as to allow the vehicle to coast; a determination means that determines whether or not a deceleration demand of the driver is larger than a predetermined value during execution of the coasting control based on the vehicle speed and the braking operation; and a termination means that determines a fact that the deceleration demand is strong if the deceleration demand is larger than the predetermined value, and that terminates the coasting control by bringing the clutch device into engagement to connect the power transmission route.

The execution means may be configured to determine the fact that the deceleration demand is strong when the braking operation has been continued longer than a predetermined period of time under a condition that the vehicle speed is higher than a reference speed.

The determination means may be configured to determine the fact that the deceleration demand is strong when an amount of the braking operation exceeds a predetermined amount under the condition that the vehicle speed is higher than the reference speed.

The vehicle control system is further provided with a means that detects a road gradient. In addition, the determination means may also be configured to determine the fact that the deceleration demand is strong if a downgrade of a road on which the vehicle is running at a speed higher than the reference speed is steeper than a predetermined gradient.

The vehicle control system is further provided with a means that detects a deceleration of the vehicle. In addition, the determination means may also be configured to determine the fact that the deceleration demand is strong when the deceleration exceeds a predetermined deceleration under the condition that the vehicle speed is higher than the reference speed.

The vehicle control system is further provided with a means that detects a distance between the vehicle and a forerunning vehicle. In addition, the determination means may also be configured to determine the fact that the deceleration demand is strong when a distance between the vehicle running at a speed higher than the reference speed and the forerunning vehicle is reduced to be shorter than a predetermined distance.

The termination means may also be configured to terminate the coasting control if the vehicle speed is lower than the reference speed when the braking operation is carried out.

According to another aspect of the present invention, the determination means is configured to determine a probability that the deceleration demand is judged to be strong based on the vehicle speed and the braking operation. In addition, the vehicle control system is further provided with a standby means that reduces a speed difference between a rotary member of the clutch device of the prime mover side and a rotary member of the clutch device of the drive wheel side prior to terminating the coasting control, by controlling a speed of the prime mover.

In this case, the determination means may be configured to determine the fact that the deceleration demand is strong when the braking operation is continued longer than a first operation time under the condition that the vehicle speed is higher than the reference speed, and to determine the fact that the probability is high when the braking operation is continued longer than a second operation time that is shorter than the first operation time.

Alternatively, the determination means may also be configured to determine the fact that the deceleration demand is strong when an amount of the braking operation is larger than a first operation amount under the condition that the vehicle speed is higher than the reference speed, and to determine the fact that the probability is high when the amount of the braking operation is larger than a second operation amount that is smaller than the first operation amount.

The vehicle control system according to another aspect of the present invention is further provided with a means that detects a road gradient. In addition, the determination means may be configured to determine the feet that the deceleration demand is strong if a downgrade of a road on which the vehicle is running at a speed higher than the reference speed is steeper than a first gradient, and to determine the fact that the probability is high if the downgrade of the road on which the vehicle is running is steeper than a second gradient that is milder than the first gradient.

The vehicle control system according to another aspect of the present invention is further provided with a means that detects an increasing amount of the vehicle speed. In addition, the determination means may also be configured to determine the fact that the deceleration demand is strong if an increasing amount of a speed of the vehicle running at a speed higher than the reference speed exceeds a first increasing amount, and to determine the fact that, the probability is high if the increasing amount of the vehicle speed exceeds a second increasing amount that is smaller than the first increasing amount.

The vehicle control system according to another aspect of the present invention is further provided with a means that detects a distance between the vehicle and a forerunning vehicle. In addition, the determination means may also be configured to determine the fact that, the deceleration demand is strong if said distance of the vehicle running at a speed, higher than the reference speed is reduced to be shorter than a first distance, and to determine the fact that the probability is high if said distance is reduced to be shorter than a second distance that, is shorter than the first distance.

Thus, according to the present invention, the clutch device is brought into disengagement to disconnect the power transmission route between the prime mover and the drive wheels. That is, the coasting control is executed to allow the vehicle to coast. Consequently, a cruising distance of the vehicle can be extended without applying a load to the prime mover so that the energy efficiency of the vehicle can be improved.

During execution of the coasting control, the vehicle control system of the present invention estimates the deceleration demand of the driver based on the vehicle speed and the duration or the amount of braking operation. For example, the control system determines a fact feat the deceleration demand of the driver is strong if the duration of the braking operation is long or the amount of the braking operation is large under the condition that the vehicle speed fails within the predetermined speed range. In this case, if the estimated deceleration demand of the driver is strong and it is necessary to decelerate the vehicle continuously, the clutch device is brought into engagement to terminate the coasting control. Consequently, the engine is connected to the drive wheels so that the braking torque derived from a load and resistance of the power transmission route is applied to the drive wheels. Therefore, the vehicle can be decelerated properly in line with the deceleration demand or intension of the driver so that drivability of the vehicle can be improved.

By contrast, if the duration of the braking operation is short or the amount of the braking operation is small under the condition that the vehicle speed falls within the predetermined speed range, the control system determines a fact that the deceleration demand of the driver is not so strong. In this case, it is not necessary to apply an engine braking force to the vehicle by terminating the coasting control. Therefore, the coasting control is continued to improve energy efficiency of the vehicle.

Thus, according to the present invention, the vehicle control system is configured to estimate the deceleration demand of the driver during the coasting control, and to determine to continue or terminate the coasting control taking account of the deceleration demand, of the driver. Therefore, drivability and efficiency of the coasting control can be improved.

According to the present invention, the deceleration demand of the driver can be estimated during the coasting control based on a vehicle speed, duration of braking operation, an amount of braking operation, a road gradient, a deceleration of the vehicle, and a distance between the vehicle and the forerunning vehicle. Therefore, the deceleration demand can be estimated accurately so that the coasting control can be carried out properly.

As described, according to the present invention, the vehicle control system determines to continue or to terminate the coasting control taking account of the vehicle speed. Specifically, if the braking operation is carried out under the condition that the vehicle speed is low, the coasting control is terminated immediately. Basically, the braking operation is carried out merely to decelerate the vehicle slightly when the vehicle runs at middle to high speed. By contrast, the braking operation is carried out to decelerate the vehicle significantly or to stop the vehicle when the vehicle runs at low speed. Therefore, the coasting control can be terminated properly by thus determining the termination of the coasting control depending on the vehicle speed.

As also described, according to the present invention, the vehicle control system is further configured to estimate a probability that the deceleration demand of the driver is judged to be strong. If the probability that the deceleration demand will be judged to be strong, a speed difference between the rotary members of the clutch device is reduced. That is, according to the present invention, the clutch device is prepared to be engaged prior to terminating the coasting control. Therefore, engagement shocks of the clutch device can be reduced on the occasion of terminating the coasting control so that drivability of the vehicle can be improved.

According to the present invention, specifically, the probability that the deceleration demand of the driver is judged to be strong can be estimated based on duration of braking operation, an amount of braking operation, a road gradient, an increasing amount of the vehicle speed, and a distance between the vehicle and the forerunning vehicle. Therefore, the probability that the deceleration demand of the driver is judged to be strong can be estimated accurately so that the coasting control can be carried out properly.

DESCRIPTION OF THE PREFERRED EMBODIMENTS

Figure 1:
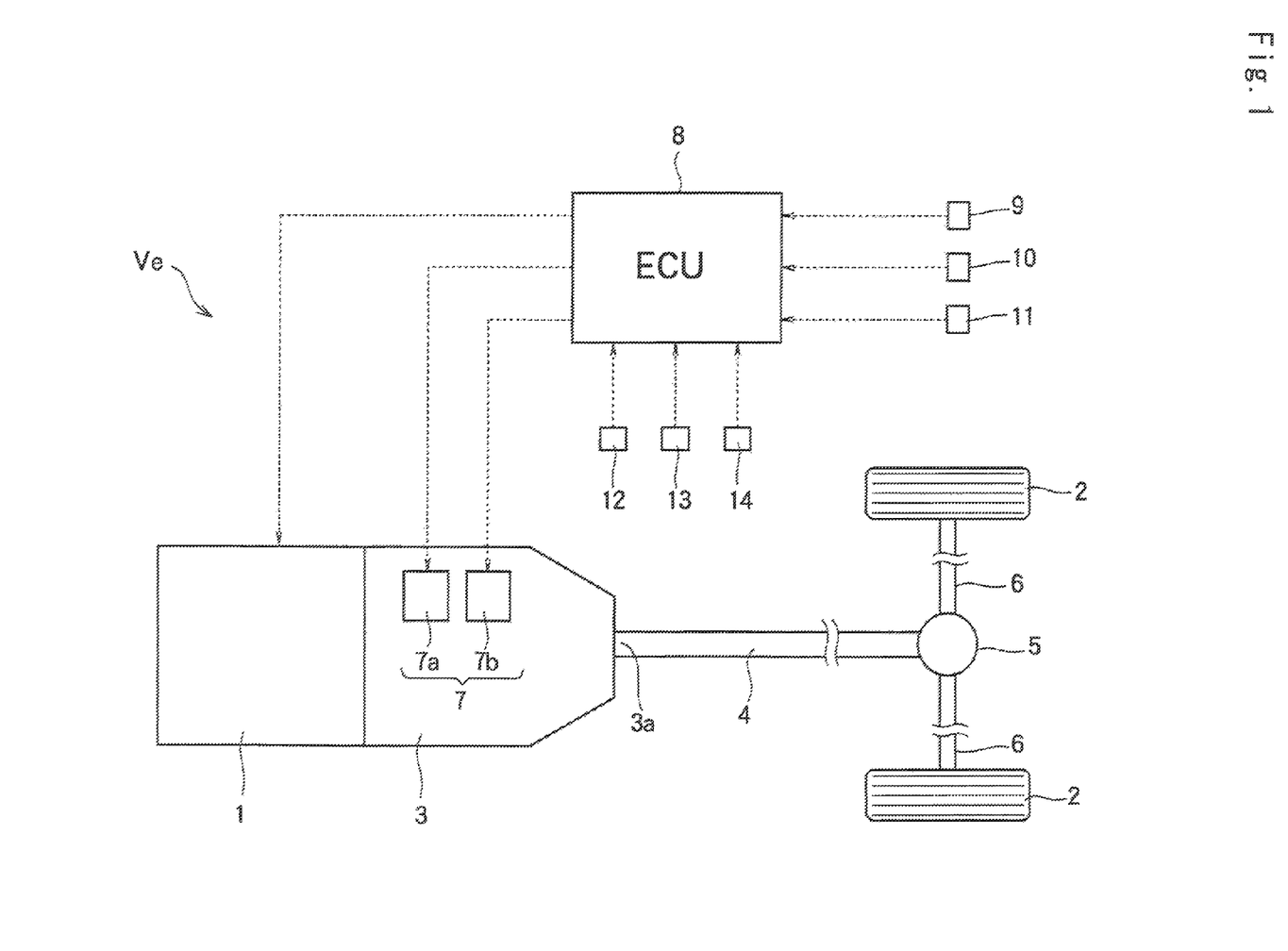
FIG. 1 is a view schematically showing an example of a drive line and a control line of the vehicle to which the control system of the present invention is applied.

Next, the present invention will be explained in more detail with reference to the accompanying drawings. FIG. 1 shows a drive line and a control line of the vehicle to which the control system of the present invention is applied. As shown in FIG. 1, the vehicle Ve is comprised of an engine 1, and an automatic transmission 3 connected to an output side of the engine 1 to transmit a power of the engine 1 to drive wheels 2. Specifically, the automatic transmission 3 is disposed on the output side of the engine 1, and an output shaft 3a of the automatic transmission 3 is connected to the drive wheels 2 to transmit power therebetween through a propeller shaft 4, a differential gear 5 and a drive shaft 6. Thus, FIG. 1 shows an example of rear-drive layout of the vehicle Ve in which the engine 1 is connected to the rear drive wheels 2 through the propeller shaft 4. However, the control system of the present invention may also be applied to a front drive vehicle and a four-wheel drive vehicle.

The engine 1 serves as a prime mover of the present invention, and for example, an internal combustion engine for generating a power by burning fuel such as a gasoline engine, a diesel engine a natural gas engine and etc. may be used. According to the example shown in FIG. 1, the gasoline engine is used as the engine 1, and the engine 1 is comprised of an electronic throttle valve an opening degree thereof is controlled electrically, and a fuel injector an injecting amount thereof is controlled electrically. Therefore, the engine 1 can be operated in an optimally fuel efficient manner by electrically controlling a rotational speed with respect to a predetermined load.

The automatic transmission 3 is adapted to transmit a torque of the engine 1 to the drive wheels 2 while carrying out a speed change. For example, a geared automatic transmission (AT), a belt-driven or toroidal continuously variable transmission (CVT), a dual-clutch automatic transmission (DCT) based on a geared manual transmission, an automatic clutch manual transmission (AMT) and so on may be used as the automatic transmission 3. The vehicle Ve is further provided with a clutch device 7 adapted to selectively allow a power transmission between the engine 1 and the drive wheels 2, irrespective of a type of the automatic transmission 3, and irrespective of a drive system such as a front drive system, a rear drive system and a four wheel drive system.

According to the example shown in FIG. 1, a geared automatic transmission having a planetary gear unit is employed as the automatic transmission 3. As the conventional AT, the automatic transmission 3 is comprised of a plurality of planetary gear units (not shown), a forward clutch 7a engaged to establish a forward stage, and a reverse brake 7b engaged to establish a reverse stage. Optionally, the automatic transmission 3 may be provided with an additional clutch or brake to be engaged to establish a predetermined forward stage. Accordingly, the automatic transmission 3 is brought info a neutral stage by disengaging both of the forward clutch 7a and the reverse brake 7b. As a result of thus disengaging the forward clutch 7a and the reverse brake 7b, the engine 1 is disconnected from the drive wheels 2 so that the power transmission therebetween is interrupted. Accordingly, in the example shown in FIG. 1, the clutch device 7 comprised of the forward clutch 7a and the reverse brake 7b serves as the clutch device of the invention.

As described, the CVT may be used as the automatic transmission 3. The conventional CVT is comprised of a belt driven transmission and a torque reversing device for reversing a direction of the torque transmitted to the drive wheels 2 between the forward direction and the backward direction. Specifically, the torque reversing device is comprised of a forward clutch engaged to establish the forward, stage and a reverse clutch, engaged to establish the reverse stage. Therefore, the power transmission between the engine 1 and the automatic transmission 3 is interrupted by disengaging both of the forward clutch and the reverse brake. That is, a neutral stage of the automatic transmission 3 is established. In this case, the forward clutch and the reverse brake serve as the clutch device of the invention.

Given that the DCT is used as the automatic transmission 3, the power transmission between the engine 1 and the automatic transmission 3 is interrupted by disengaging both of the clutches of the DCT. That is, a neutral stage of the automatic transmission 3 is established. In this case, the two clutches of the DCT serve as the clutch device of the invention.

Given that the AMT is used as the automatic transmission 3, the power transmission between the engine 1 and the automatic transmission 3 is interrupted by disengaging a clutch of the conventional manual transmission device and the engine 1. That is, a neutral stage of the automatic transmission 3 is established. In this case, the above-explained clutch serves as the clutch device of the invention.

The control system of the present invention may be applied not only to a hybrid vehicle in which the prime mover is comprised of an internal combustion engine and an electric motor, but also to an electric vehicle in which only the electric motor is used as the prime mover. In order to selectively connect and disconnect the power transmission route between the prime mover and the drive wheels 2, according to the present invention, the vehicle Ve is provided with the clutch device 7 irrespective of a kind of the prime mover such as the engine 1, the electric motor, and a hybrid drive unit, comprised of the engine 1 and the electric motor. For example, a friction clutch and a dog clutch may be used as the clutch device 7, and in case of using the friction clutch, any of a wet type and a dry type friction clutches may be used. That is, any kinds of clutch devices may be used as the clutch device 7 to selectively allow and interrupt a power transmission route between the prime mover such as the engine 1, the electric motor, and a hybrid drive unit and the drive wheels 2 to transmit power therebetween.

Given that the vehicle Ve is the hybrid vehicle or the electric vehicle having the electric motor as the prime mover, a braking force can be applied to the vehicle Ve by carrying out a regeneration control of the electric motor while engaging the clutch device 7. Specifically, a braking torque can be applied to the drive wheels 2 to decelerate the vehicle Ve during running by operating the electric motor as a generator while engaging the clutch device 7.

In order to control an operating condition of the engine 1 and engagement state of the clutch device 7, the vehicle Ve is provided with an electronic control unit (ECU) 8 as a controller that is configured to carry out a calculation based on input data and preinstalled data, and to output a calculation result in the form of a command signal. For example, detection signals from a wheel speed sensor 9 adapted to defect a rotational speed of each wheel of the vehicle Ve, an accelerator sensor 10 adapted to detect a depressing angle or a depressing amount of an accelerator pedal, a brake sensor 11 adapted to detect a depressing angle or a depressing amount of a brake pedal, an acceleration sensor 12 adapted to detect acceleration of the vehicle Ve, an inclination sensor 13 adapted to detect an inclination angle of the vehicle Ve, a distance sensor adapted to detect a distance between the vehicle Ve and a forerunning vehicle and so on are sent to the electronic control unit 8. Based on those signals, the electronic control unit 8 sends a command signals to the engine 1 to control the operating condition, and to the clutch device 7 to control the engagement state.

Given that the electric motor is used as the prime mover of the vehicle Ve, a detection signal from a speed sensor for the electric motor or a resolver is additionally sent to the electronic control unit 8. In this case, the electronic control unit 8 sends a command signal to the electric motor to control the operating condition.

In order to improve fuel economy of the vehicle Ve thus structured, the control system of the present invention carries out the coasting control of the vehicle Ve by bringing the clutch device 7 into disengagement during running. According to the present invention, specifically, the coasting control is carried out to cutoff a power transmission route between the engine 1 and the drive wheel 2 by disengaging the clutch device 7, under a condition that the accelerator pedal is not depressed, in other words, completely returned while the vehicle Ve is moving at a speed higher than a predetermined speed. Under the neutral coasting control, however, the engine 1 will not be stopped. That is, under the neutral coasting control, although the speed of the engine 1 is lowered almost to an idling speed, the fuel combustion is carried on.

Thus, under the coasting control, a power transmission between the engine 1 and the drive wheel 2 is interrupted. Therefore, a braking torque resulting from a pumping loss of the engine 1 and a drag torque will not be applied to the drive wheels 2 of the vehicle Ve. In other words, an engine braking force will not be applied to the vehicle Ve. Therefore, under the coasting control, a possible coasting distance achieved by an inertia energy of the vehicle Ve is extended. Consequently, a cruising distance of the vehicle Ve per unit of fuel can be extended so that the fuel economy of the vehicle Ve can be improved.

Under the coasting control, the fuel economy of the vehicle Ve can be further improved if the fuel combustion of the engine 1 is stopped while disengaging the clutch device 7. However, if the fuel combustion of the engine 1 is stopped, a power for actuating auxiliaries such as an oil pump and a compressor for an air conditioner, and a power for actuating a hydraulic power steering system and a brake system will be lost. In this case, therefore, a substitute power source (e.g., an electric motor) and a hydraulic accumulator are required for the case of cessation of the engine 1. By contrast, given that the engine 1 is not stopped under the coasting control, the power for driving those auxiliaries and the power steering and the brake systems will not be lost. In this case, therefore, the coasting control can be carried out easily in the conventional vehicles without requiring the additional power source.

The control system of the present invention is configured to control a braking force applied to the vehicle Ve by appropriately determining whether or not, to continue or to terminate the coasting control when the driver operates the brake device during execution of the coasting control.

First Example

Figure 2:
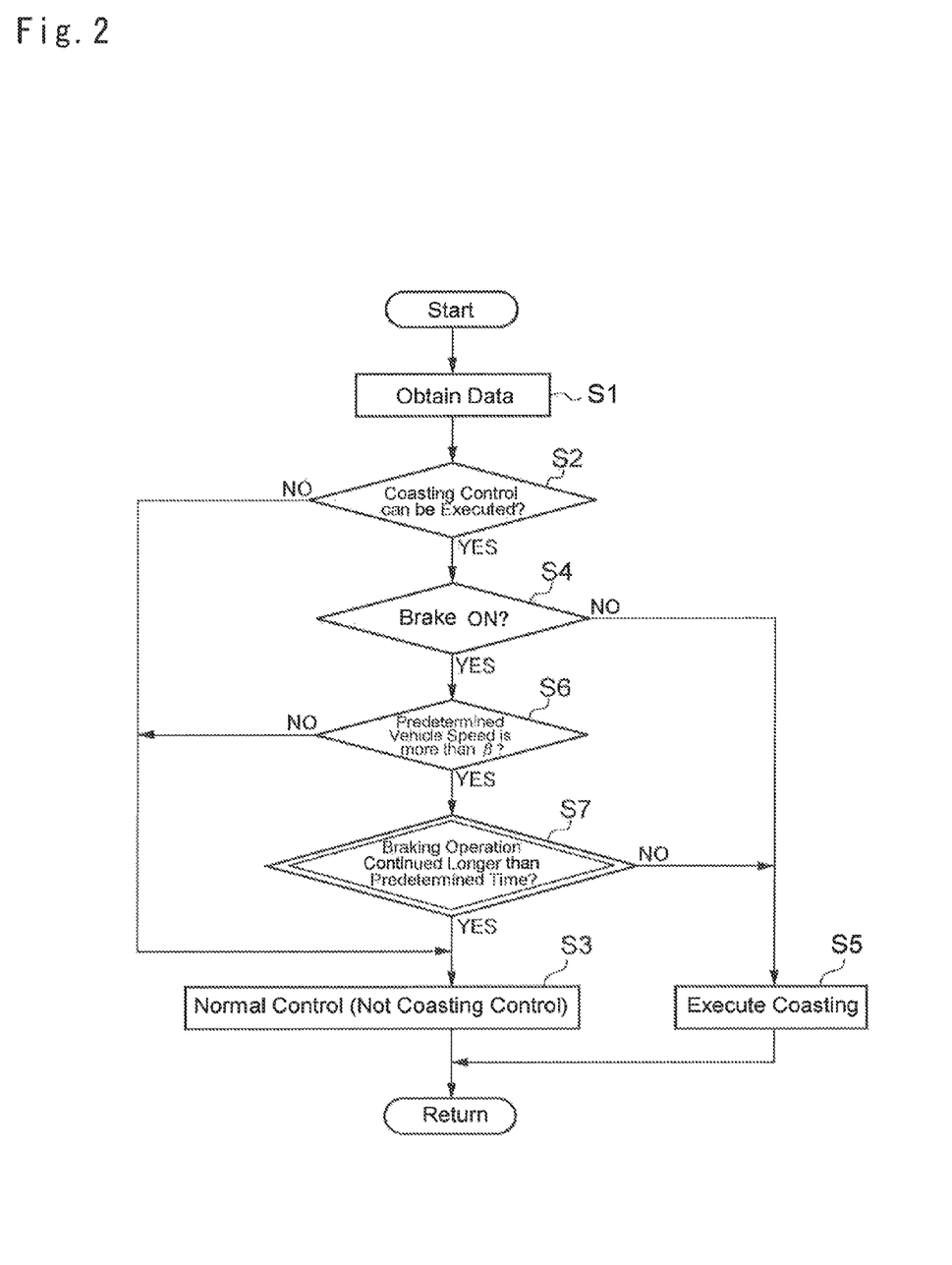
FIG. 2 is a flowchart showing the first example of the coasting control carried out by the control system of the present invention.

Referring now to FIG. 2, there is shown the first control example, and the routine shown therein is repeated at predetermined short intervals. First of all, data about a running condition and an operating condition of the vehicle Ve is obtained (at step S1). Specifically, a speed of the vehicle Ve is obtained based on a detection value of the wheel speed sensor 9, an operating amount of the accelerator is obtained based on a detection value of the accelerator sensor 10, an operating amount of the brake pedal is obtained based on a detection value of the brake sensor 1, a road grade is obtained based on a detection value of the acceleration sensor 12 or the inclination sensor 13, and a distance from the forerunning vehicle is obtained based on a detection value of the distance sensor 14.

Figure 3:
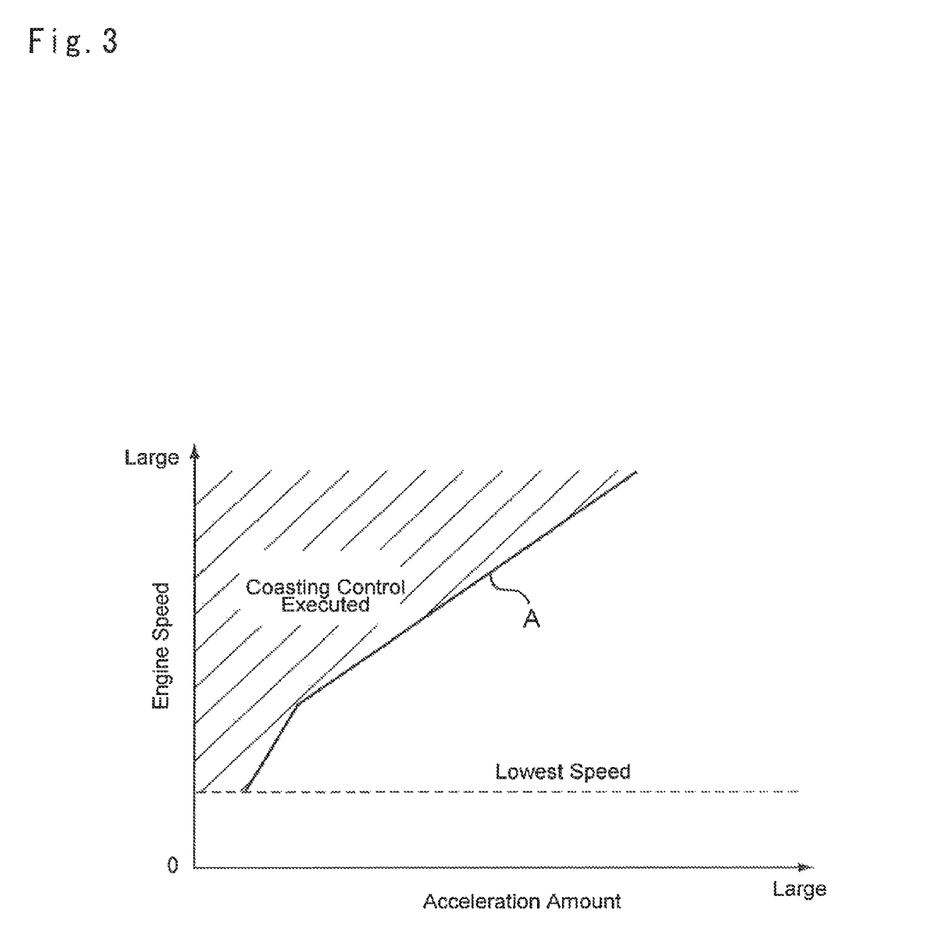
FIG. 3 shows one example of a map used in the coasting control according to the present invention.

Then, it is determined whether or not the coasting control can be executed based on the data obtained at step S1 (at step S2). Specifically, it is determined whether or not an execution condition of the coasting control is satisfied. According to the present invention, the neutral coasting control is triggered by the fact that the operating amount of the accelerator is reduced to zero or to be smaller than a predetermined value while the vehicle Ve is running at a speed higher than a reference speed α. Specifically, the fact that the operating amount of the accelerator is reduced to zero or to be smaller than a predetermined value is a condition to determine whether or not the accelerator pedal depressed by the driver is released and returned. The reference value of the operating amount of the accelerator used to determine to execute the neutral coasting control is not necessarily to be zero. For example, as indicated in the map shown in FIG. 3, the neutral coasting control is commenced when the operating amount of the accelerator is reduced to be smaller than a reference value A. Optionally, as shown in FIG. 3, the reference value A may be altered in accordance with the engine speed Ne.

The reference speed α is a threshold value of the vehicle speed used to determine to execute the coasting control within a speed range where the neutral coasting control is effective. Given that the vehicle Ve has a torque converter, the threshold value is set e.g., to 15 to 20 km/h that is a speed of the vehicle Ve creeping on a flat road while idling the engine 1. To this end, the reference speed α is determined based on a simulation result or an experiment.

Optionally, a fact that a road grade on which the vehicle Ve is running fails within a predetermined range across 0%, and a fact that the engine 1 is combusted may be added to the execution condition of the coasting control. Specifically, such range of the road grade is used as a reference range to determine if the road is a flat road where the gradient is 0%, or if an upgrade or a downgrade will not affect a running load and ignorable. To this end, such range of the road grade is determined based on a simulation result or an experiment, and may also be altered in accordance with the vehicle speed. For example, the range of the road grade is set to ±2% within the speed range lower than 40 km/h, and set to ±4% within the speed range higher than 40 km/h.

According to the first example shown in FIG. 2, an execution of the coasting control is determined upon satisfaction of all of the above-mentioned execution conditions. Specifically, the coasting control is allowed to be carried out under the condition that the vehicle Ve is propelled by a drive force of the engine 1, that the vehicle Ve is running on the road where the gradient thereof falls within the predetermined range at the speed higher than the reference speed α, and that the operating amount of the accelerator is reduced to be smaller than the reference value A.

If at least any one of the above-mentioned execution conditions is not satisfied so that, the answer of step S2 is NO, the routine advances to step S3 to continue the normal control without carrying out the coasting control. In this case, for example, the fuel cut-off control may be carried out to temporarily stop the fuel supply to the engine 1. Otherwise, if the vehicle Ve is powered by the electric motor, a regeneration control is carried out by operating the electric motor as a generator to generate a regeneration torque. Thus, an engine braking force or a braking force derived from the regeneration torque of the electric motor is applied to the vehicle Ve in this case. If the coasting control has already been commenced, the coasting control is terminated. In this case, specifically, the clutch device 7 that has been in disengagement, during the coasting is brought into engagement to enable power transmission between the engine 1 and the drive wheels 2. In addition, the above-explained normal controls such as the fuel cut-off and the power regeneration etc, are carried out. Then the routine is returned.

By contrast, if all of the above-mentioned execution conditions to carry out the neutral coasting control are satisfied so that the answer of step S2 is YES, the routine advances to step S4 to determine whether or not the brake is ON, that is, whether or not the brake device is operated by the driver. If the brake device is not operated so that the answer of step S4 is NO, the routine advances to step S5 to carry out the coasting control. That is, if the coasting control has not yet been commenced, the coasting control is commenced. By contrast, if the coasting control has already been commenced, the coasting control is continued.

Specifically, the clutch device 7 is brought into disengagement to allow the vehicle Ve to coast. In this situation, the power transmission between the engine 1 and the drive wheels 2 is interrupted so that a load on the engine 1 is eliminated. In addition, under the neutral coasting in which the engine is combusted, the rotational speed of the engine 1 is lowered to the idling speed. Here, the definition of the "idling speed" is a speed lower than a speed range of the engine 1 under the normal running, and a lowest speed at which the engine 1 free from the load is allowed to rotate autonomously. Specifically, the definition of the "normal running" is a running condition of the vehicle Ve in which the clutch device 7 is in engagement to power the vehicle Ve by the engine 1. After commencing the neutral coasting control at step S5, the routine is returned.

By contrast, if the brake pedal is depressed by the driver to operate the brake device so that the answer of step S4 is YES, the routine advances to step S6 to determine whether or not the current vehicle speed is higher than a predetermined speed $\beta$. Specifically, the predetermined speed $\beta$ is a threshold value used to determine a middle to high speed range, and to this end, the predetermined speed $\beta$ is set to be higher than the aforementioned reference speed $\alpha$. The braking operation is carried out for different purposes depending on a vehicle speed. For example, given that the vehicle runs at middle to high speed, the braking operation is carried out merely to decelerate the vehicle slightly. By contrast, given that the vehicle runs at low speed, the braking operation is carried out to decelerate the vehicle significantly or to stop the vehicle. That is, the predetermined speed $\beta$ used at step S6 is set to an intermediate speed between the middle to high speed range where the braking operation is carried out to reduce the vehicle speed slightly or temporarily and the low speed range where the braking operation is carried out to reduce the vehicle speed significantly or to stop the vehicle. The predetermined speed $\beta$ is determined based on a simulation result or an experiment, and according to the preferred examples, the predetermined speed $\beta$ is set to 50 to 60 km/h.

Figure 4:
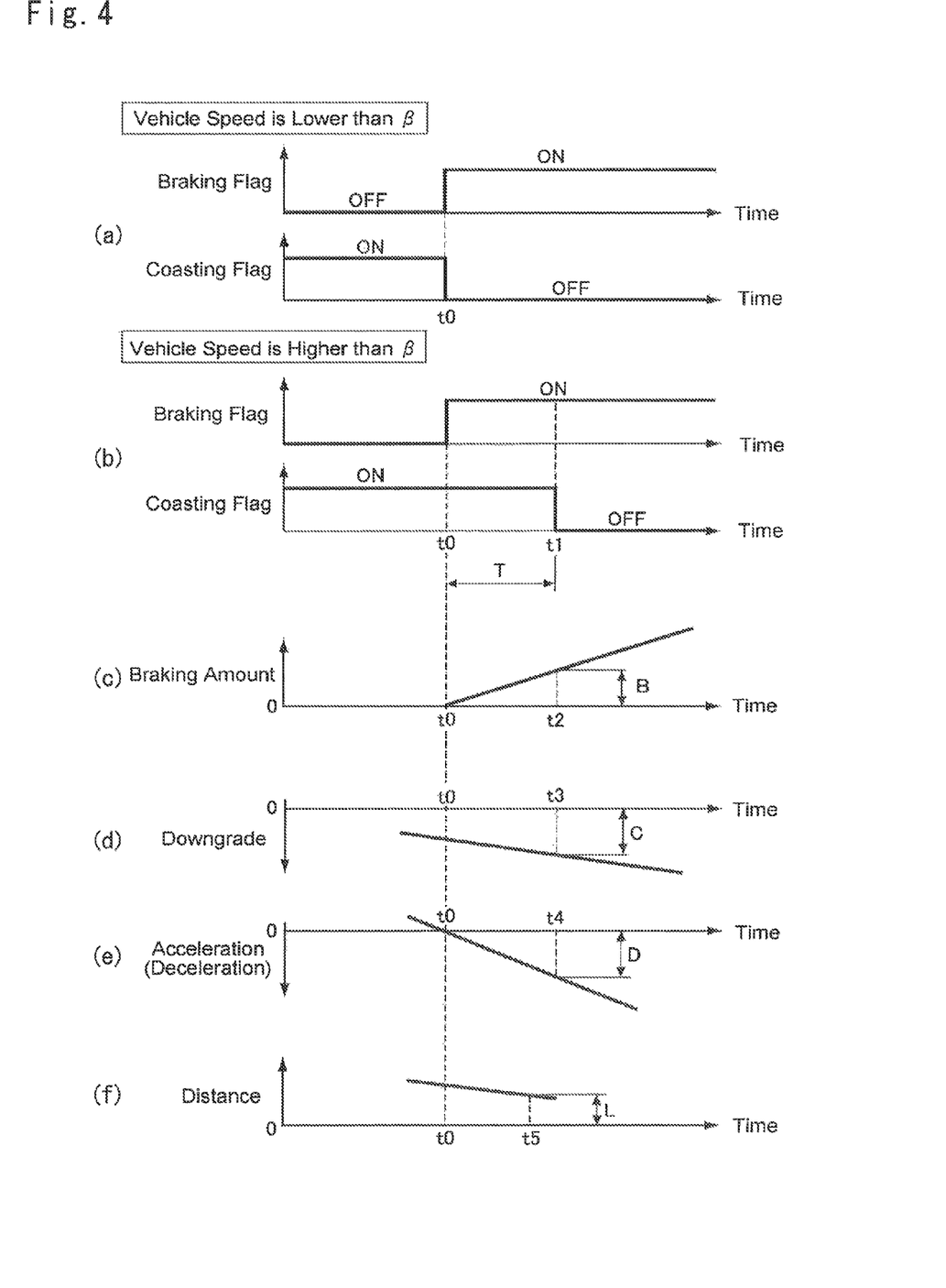
FIG. 4 is a time chart showing a situation under the first example shown in FIG. 1 and an estimation of a deceleration demand of the driver.

If the current vehicle speed is lower than the predetermined speed, $\beta$ so that the answer of step S6 is NO, the routine advances to step S3 to carry out the normal control instead of the coasting control. In this case, if the coasting control has already been commenced, the coasting control is terminated and the normal controls such as the fuel cut-off and the power regeneration etc. are carried out. That is, if the vehicle speed at the moment of operating the brake device during the coasting is lower than the predetermined speed $\beta$, the coasting control is terminated immediately and the normal control is carried out. Specifically, as indicated in the time chart, shown in FIG. 4(a), when the brake device is operated and a braking flag is set to ON at point t0, a coasting flag is simultaneously set to OFF to terminate the coasting. Consequently, the vehicle Ve is decelerated not only by the engine braking force but also by a braking force established by the brake device attached to the wheel. In this case, the engine braking force is continuously applied to the vehicle Ve even after the brake pedal is completely returned to cancel the braking force. As a result, increment of the vehicle speed is suppressed or the vehicle speed is lowered. Then, the routine is returned.

By contrast, if the current vehicle speed is higher than the predetermined, speed $\beta$ so that the answer of step S6 is YES, the routine advances to step S7. At step S7, in order to estimate a decelerating or braking demand of the driver, it is determined whether or not the braking operation has been continued longer than a predetermined period of time T, that is, whether or not the braking flag has been kept to ON longer than a predetermined period of time T. Specifically, if the braking operation of the driver has been continued longer than a predetermined period of time T, the controller determines that the driver has a desire to decelerate the vehicle strongly. To the contrary, if the braking operation of the driver has not been continued longer than a predetermined period of time T, the controller determines that the driver intends to decelerate the vehicle not so strongly. To this end, the predetermined period of time T is determined based on a simulation result or an experiment, and according to the preferred examples, the predetermined period of time T is set approximately to 2 seconds.

If the braking operation of the driver has not been continued longer than a predetermined period of time T, that, is, if the controller determines that, the driver intends to decelerate the vehicle not so strongly so that the answer of step S7 is NO, the routine advances to step S5 to commence or continue the coasting control. Then, the routine is returned.

By contrast, if the braking operation of the driver has been continued longer than a predetermined period of time T, that is, if the controller determines that the driver has a desire to decelerate the vehicle strongly so that the answer of step S7 is YES, the routine advances to step S3 to carry out the normal control instead of the coasting control. In this case, if the coasting control has already been commenced, the coasting control is terminated and the normal controls such as the fuel cut-off and the power regeneration etc. are carried out.

Specifically, as indicated in the time chart shown in FIG. 4(b), the predetermined period of time T is started at point t0 and the coasting flag is set to OFF at point t1 when the predetermined period of time T has elapsed to terminate the coasting and to return to the normal control. Consequently, the vehicle Ve is decelerated not only by the engine braking force but also by a braking force established by the brake device attached to the wheel. In this case, the engine braking force is also applied continuously to the vehicle Ve even after the brake pedal is completely returned to cancel the braking force. As a result, an increase in the vehicle speed is suppressed or the vehicle speed, is lowered. Then, the routine is returned.

Alternatively, the estimation of the braking demand of the driver at step S7 of the first example shown in FIG. 2 may also be made by the flowing procedures. According to a modification example, at step S7, it is determined whether or not an amount of braking operation of the driver is larger than a predetermined operation amount B. In this case, for example, the controller determines that the driver has a desire to decelerate the vehicle strongly if a depressing amount or a depressing angle of the brake pedal is larger than the operation amount B. By contrast, if the amount of braking operation of the driver is smaller than the operation amount B, the controller determines that the driver intends to decelerate the vehicle not so strongly. According to the modification example, if the amount of braking operation has not yet exceeded the operation amount B so that the answer of step S7 is NO, the routine advances to step S5 to commence or continue the coasting control. By contrast, if the amount of braking operation is larger than the operation amount B so that the answer of step S7 is YES, the routine advances to step S3 to terminate the coasting control or to continue the normal control without commencing the coasting control. Specifically, the aforementioned fuel cut-off, the motor regeneration etc. are carried out.

Specifically, as indicated in the time chart shown in FIG. 4(c), the braking operation is commenced at point t0, and the coasting control is terminated at point t2 when the amount of braking operation reaches the operation amount B. Consequently, the engine braking force is applied to the vehicle Ve. Thus, the controller determines that the driver has a desire to decelerate the vehicle strongly when the amount of braking operation reaches the operation amount B, and consequently, the vehicle Ve is decelerated not only by the engine braking force but also by a braking force established by the brake device attached to the wheel. To this end, the operation amount B is determined based on a simulation result or an experiment, and according to the modification example, the operation amount B is set approximately to 30%.

The estimation of the braking demand of the driver at step S7 may also be determined based on a road gradient. In this case, at step S7, it is determined whether or not a downgrade of a slope is steeper than a predetermined gradient C. If the downgrade of the slope is steeper than the predetermined gradient C, the controller determines that the driver has a desire to decelerate the vehicle strongly or that the driver will require a stronger deceleration. By contrast, if the downgrade of the slope is not steeper than a predetermined gradient C or the vehicle climbs on an upgrade, the controller determines that the driver intends to decelerate the vehicle not so strongly or that the driver will not require a stronger deceleration. In this case, if the downgrade of the slope is not steeper than the predetermined gradient C or the vehicle climbs on an upgrade so that the answer of step S7 is NO, the routine advances to step S5 to commence or continue the coasting control. By contrast, if the downgrade of the slope is steeper than the predetermined gradient C so that the answer of step S7 is YES, the routine advances to step S3 to terminate the coasting control or to continue the normal control without commencing the coasting control. Specifically, the aforementioned fuel cut-off, the motor regeneration etc. are carried out.

In this case, as indicated in the time chart shown in FIG. 4(d), the coasting control is terminated at point t3 when the downgrade of the slope exceeds the predetermined gradient C. Consequently, the engine braking force is applied to the vehicle Ve. Thus, the controller determines that the driver has a desire to decelerate the vehicle strongly when the downgrade of the slope exceeds the predetermined gradient C, and consequently, the vehicle Ve is decelerated not only by the engine braking force but also by a braking force established by the brake device attached to the wheel. To this end, the predetermined gradient C is determined based on a simulation result or an experiment, and according to the modification example, the predetermined gradient C is set approximately to 5%.

The estimation of the braking demand of the driver at step S7 may also be determined based on a deceleration of the vehicle Ve. In this case, at step S7, it is determined whether or not a deceleration of the vehicle Ve is greater than a predetermined deceleration D. If the deceleration of the vehicle Ve is greater than the predetermined deceleration D, the controller determines that the driver has a desire to decelerate the vehicle strongly. By contrast, if the deceleration of the vehicle Ve is smaller than the predetermined deceleration D, the controller determines that the driver intends to decelerate the vehicle not so strongly. In this case, if the deceleration of the vehicle Ve is smaller than the predetermined deceleration D so that the answer of step S7 is NO, the routine advances to step S5 to commence or continue the coasting control. By contrast, if the deceleration of the vehicle Ve is greater than the predetermined deceleration D so that the answer of step S7 is YES, the routine advances to step S3 to terminate the coasting control or to continue the normal control without, commencing the coasting control. Specifically, the aforementioned fuel cut-off, the motor regeneration etc, are carried out.

In this case, as indicated in the time chart shown in FIG. 4(e), the coasting control is terminated at point t4 when the deceleration of the vehicle Ve exceeds the predetermined deceleration D. Consequently, the engine braking force is applied to the vehicle Ve. Thus, the controller determines that the driver has a desire to decelerate the vehicle strongly when the deceleration of the vehicle Ve exceeds the predetermined deceleration D, and consequently, the vehicle Ve is decelerated not only by the engine braking force but also by a braking force established by the brake device attached to the wheel. To this end, the predetermined deceleration D is determined based on a simulation result or an experiment, and according to the modification example, the predetermined deceleration D is set approximately to 0.1 G.

The estimation of the braking demand of the driver at step S7 may also be determined based on a distance between the vehicle Ve and a forerunning vehicle. In this case, at step S7, it is determined whether or not a distance between the vehicle Ve and a forerunning vehicle is shorter than a predetermined distance L. If the distance between the vehicle Ve and the forerunning vehicle is shorter than the predetermined distance L, the controller determines that the driver will require a stronger deceleration. By contrast, if the distance between the vehicle Ve and the forerunning vehicle is longer than the predetermined distance L, the controller determines that the driver will not require a stronger deceleration. In this case, if the distance between the vehicle Ve and the forerunning vehicle is longer than the predetermined distance L so that the answer of step S7 is NO, the routine advances to step S5 to commence or continue the coasting control. By contrast, if the distance between the vehicle Ve and the forerunning vehicle is shorter than the predetermined distance L so that the answer of step S7 is YES, the routine advances to step S3 to terminate the coasting control or to continue the normal control without commencing the coasting control. Specifically, the aforementioned fuel cut-off, the motor regeneration etc. are carried out.

In this case, as indicated in the time chart shown in FIG. 4(f), the coasting control is terminated at point t5 when, the distance between, the vehicle Ve and the forerunning vehicle is reduced to be shorter than the predetermined distance L. Consequently, the engine braking force is applied to the vehicle Ve. Thus, the controller determines that the driver will require a stronger deceleration when the distance between the vehicle Ve and the forerunning vehicle is reduced to be shorter than the predetermined distance L, and consequently, the vehicle Ve is decelerated not only by the engine braking force but also by a braking force established by the brake device attached to the wheel. To this end, the predetermined distance L is determined based on a simulation result or an experiment with respect to a vehicle speed. Optionally, the predetermined distance L may be altered depending on a vehicle speed. According to the modification example, the predetermined distance L is set approximately to 50 m given that the vehicle speed is 80 km/h.

Thus, according to the first control example, the braking demand of the driver can be estimated based on a vehicle speed, a length of time of braking operation, an amount of braking operation, a road gradient, a deceleration of the vehicle Ve, and a distance between the vehicle Ve and the forerunning vehicle. Therefore, the deceleration demand of the driver can be estimated accurately to carry out the coasting control.

Second Example

Figure 5:
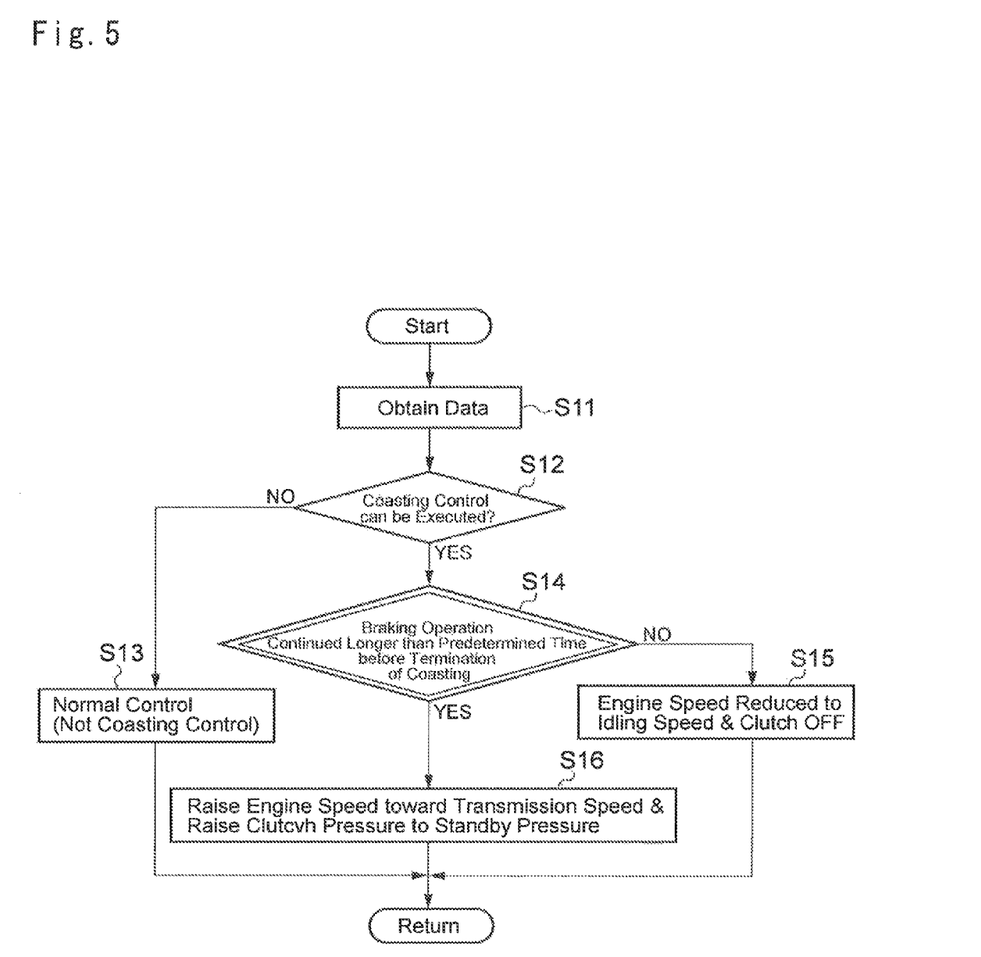
FIG. 5 is a flowchart showing the second example of the coasting control carried out by the control system of the present invention.

Referring now to FIG. 5, there is shown the second control example, and the routine shown therein is repeated at predetermined short intervals. First of all, data about a running condition, and an operating condition of the vehicle Ve is obtained (at step S11). Specifically, a speed of the vehicle Ve is obtained based on a detection value of the wheel speed sensor 9, an operating amount of the accelerator is obtained based on a detection value of the accelerator sensor 10, an operating amount of the brake pedal is obtained based on a detection value of the brake sensor 11, a road grade is obtained based on a detection value of the acceleration sensor 12 or the inclination sensor 13, and a distance from the forerunning vehicle is obtained based on a detection value of the distance sensor 14.

Then, it is determined whether or not the coasting control can be executed based on the data obtained at step S11 (at step S12). Specifically, it is determined whether or not an execution condition of the coasting control is satisfied. According to the present invention, the neutral coasting control is triggered by the fact that the operating amount of the accelerator is reduced, to zero or to be smaller than a predetermined value while the vehicle Ve is running at a speed higher than a reference speed $\alpha$. Specifically, the fact that the operating amount of the accelerator is reduced to zero or to be smaller than a predetermined value is a condition to determine whether or not the accelerator pedal depressed by the driver is released and returned. The reference value of the operating amount of the accelerator used to determine to execute the neutral coasting control is not necessarily to be zero. For example, as indicated in the map shown in FIG. 3, the neutral coasting control is commenced when the operating amount of the accelerator is reduced to be smaller than a reference value A. Optionally, as shown in FIG. 3, the reference value A may be altered in accordance with the engine speed Ne.

The reference speed $\alpha$ is a threshold value of the vehicle speed used to determine to execute the coasting control within a speed range where the neutral coasting control is effective. Given that the vehicle Ve has a torque converter, the threshold value is set e.g., to 15 to 20 km/h that is a speed of the vehicle Ve creeping on a flat road while idling the engine 1. To this end, the reference speed $\alpha$ is determined based on a simulation result or an experiment.

Optionally, a fact that a road grade on which the vehicle Ve is running falls within a predetermined range across 0%, and a fact that the engine 1 is combusted may be added to the execution condition of the coasting control. Specifically, such range of the road grade is used as a reference range to determine if the road is a flat road where the gradient is 0%, or if an upgrade or a downgrade will not affect a running load and ignorable. To this end, such range of the road grade is determined based on a simulation result or an experiment, and may also be altered in accordance with the vehicle speed. For example, the range of the road grade is set to ±2% within the speed range lower than 40 km/h, and set to ±4% within the speed range higher than 40 km/h.

According to the second example shown in FIG. 5, an execution of the coasting control is determined upon satisfaction of all of the above-mentioned execution conditions. Specifically, the coasting control is allowed to be carried out under the condition that the vehicle Ve is propelled by a drive force of the engine 1, that the vehicle Ve is running on the road where the gradient thereof falls within the predetermined range at the speed higher than the reference speed $\alpha$, and that the operating amount of the accelerator is reduced to be smaller than the reference value A.

If at least any one of the above-mentioned execution conditions is not satisfied so that the answer of step S12 is NO, the routine advances to step S13 to continue the normal control without carrying out the coasting control. In this case, for example, the fuel cut-off control may be carried out to temporarily stop the fuel supply to the engine 1. Otherwise, if the vehicle Ve is powered by the electric motor, a regeneration control is carried out by operating the electric motor as a generator to generate a regeneration torque. Thus, an engine braking force or a braking force derived from the regeneration torque of the electric motor is applied to the vehicle Ve in this case. If the coasting control has already been commenced, the coasting control is terminated. In this case, specifically, the clutch device 7 that has been in disengagement during the coasting is brought into engagement to enable power transmission between the engine 1 and the drive wheels 2. In addition, the above-explained normal controls such as the fuel cut-off and the power regeneration etc. are earned out. Then the routine is returned.

By contrast, if all of the above-mentioned execution conditions to carry out the neutral coasting control are satisfied so that the answer of step S12 is YES, the routine advances to step S14 to determine whether or not the braking operation has been continued longer than a predetermined period of time that expires just before a termination of the coasting control. To this end, a first operate time T1 for determining a termination of the coasting control and a second operate time T2 for determining a commencement of an after-mentioned waiting time are used at step S14. Specifically, the first operate time T1 is used to estimate a deceleration demand of the driver or an intension of the driver to decelerate the vehicle. For example, if the braking operation of the driver has been continued longer than the first, operate time T1, the controller determines that the driver has a desire to decelerate the vehicle strongly. By contrast, if the braking operation is terminated within the first operate time T1, the controller determines that the driver intends to decelerate the vehicle not so strongly. To this end, the first operate time T1 and the second operate time T2 are determined based on a simulation, result or an experiment. According to the second example, specifically, the first operate time T1 is set approximately to 2 seconds, and the second operate time T2 is set approximately to 1.5 seconds. Thus, the second operate time T2 is 0.5 seconds shorter than the first operation time T1.

At step S14, in addition, it is determined whether or not the braking operation has been continued longer than the second operate time T2. That is, a probability that the driver will require stronger deceleration is determined at step S14. Specifically, if the braking operation of the driver has been continued longer than the second operate time T2, the probability that the driver will require stronger deceleration is judged to be high. In other words, the controller determines it is likely that the driver will require the stronger engine braking force achieved under the normal controls such as the fuel cut-off and the motor regeneration. By contrast, if the braking operation of the driver has not been continued longer than the second operate time T2, the probability that the driver will require stronger deceleration is judged to be low.

If the braking operation of the driver has not been continued longer than the second operate time T2, that is, if the probability that the driver will require stronger deceleration is judged to be low so that the answer of step S14 is NO, the routine advances to step S15 to lower the speed of the engine 1 to the Idling speed. In addition, a control pressure applied to the clutch device 7 is reduced to zero as indicated "OFF" in FIG. 5. In this case, the operating amount of the accelerator is thus reduced to be smaller than the reference value A, but the braking operation has not yet been commenced or a duration of the braking operation is shorter than each operate time T1 and T2. Therefore, the clutch device 7 is brought into disengagement to continue or commence the coasting control. Then, the routine is returned.

By contrast, if the braking operation of the driver has been continued longer than the second operate time T2, that is, if the probability that the driver will require stronger deceleration is judged to be high so that the answer of step S14 is YES, the routine advances to step S16. In this situation, the control of step S15, that is, the coasting control has already been commenced until the duration of the braking operation exceeds the second operate time T2. At step S16, therefore, a standby control to terminate the coasting control is executed.

Such standby control is carried out preliminary to terminate the coasting smoothly. To this end, specifically, a speed difference between rotary members of the clutch device 7 of the engine 1 side and the drive wheels 2 side is reduced. Specifically, given that the clutch device 7 is disposed between the output shat of the engine 1 and the input shaft of the transmission 3, the speed of the engine 1 is raised toward the speed of the input shaft of the transmission 3. In addition, the control pressure for hydraulically actuating the clutch device 7 is preliminary raised to a standby pressure and kept thereto. To this end, the standby pressure is set to a highest level at which the clutch device 7 will not be brought into engagement.

Figure 6:
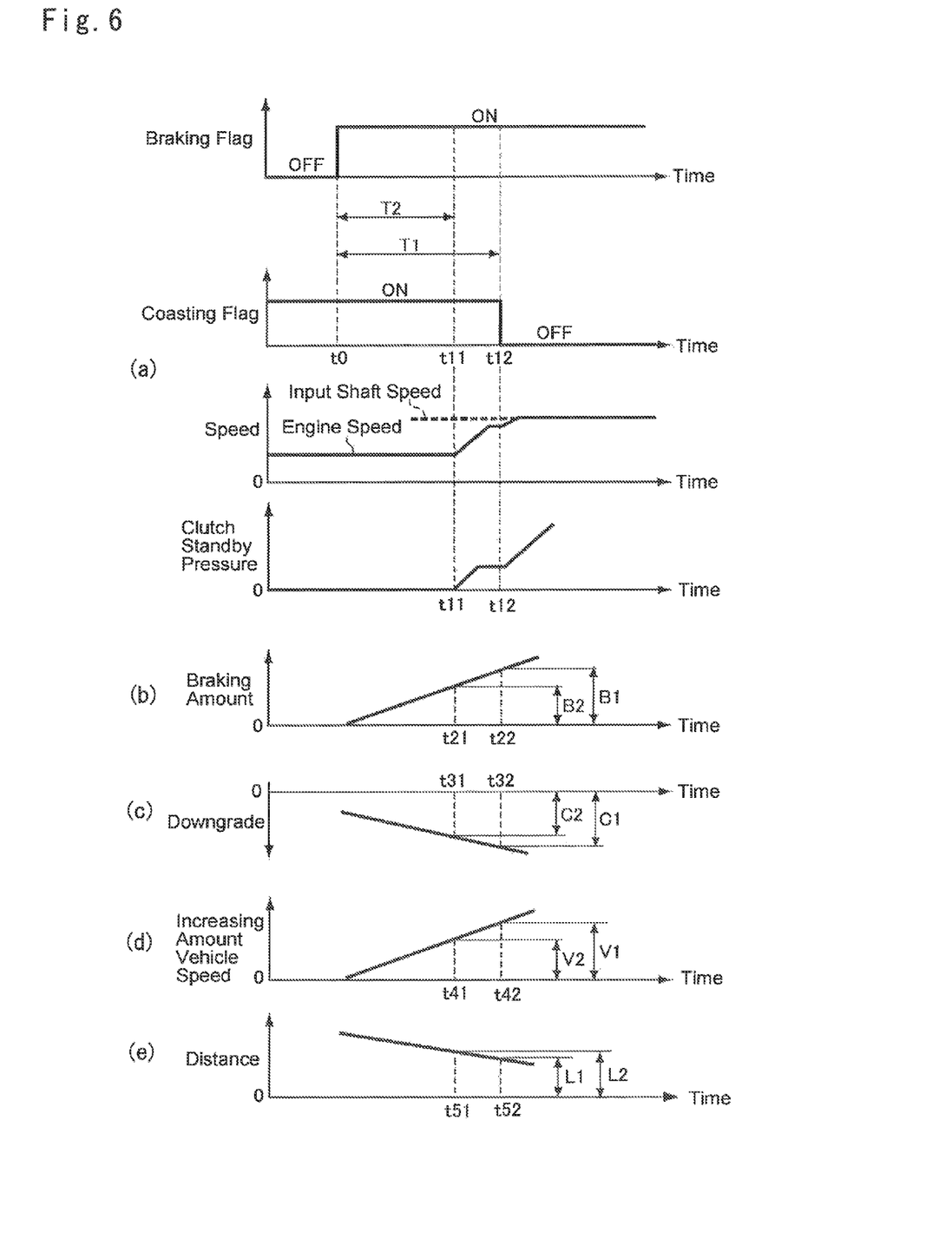
FIG. 6 is a time chart, showing a situation under the second example shown in FIG. 1 and an estimation of a probability that the deceleration demand of the driver will increase.

Specifically, as indicated in the time chart shown in FIG. 6(a), the braking operation is commenced at point t0, and the speed of the engine 1 is raised toward the input shaft speed of the transmission 3 and the control pressure for the clutch device 7 is raised to the standby pressure at point t11 when the second operate time T2 has elapsed. That is, the standby control for terminating the coasting control smoothly is executed at point t11. Then, the coasting flag is turned to OFF at point t12 when the first operate time T1 has elapsed. Consequently, the control pressure for the clutch device 7 is further raised to bring the clutch device 7 into engagement. That is, the coasting control is terminated and returned to the normal control. As a result, the vehicle Ve is decelerated not only by the engine braking force but also by a braking force established by the brake device attached to the wheel. In this situation, the engine braking force is continuously applied to the vehicle Ve even after the brake pedal is completely returned to cancel the braking force so that an increase in the vehicle speed is suppressed or the vehicle speed is lowered. Then, the routine is returned.

Thus, the standby control is executed prior to terminating the coasting control so that the coasting control can be terminated smoothly. Specifically, the speed difference between the rotary members of the clutch device 7 is reduced prior to be engaged to terminate the coasting so that engagement shocks can be reduced. In addition, the control pressure for engaging the clutch device 7 is preliminary raised to the predetermined level so that the clutch device 7 is allowed to be brought into engagement promptly. After thus carrying out the standby control, the routine is returned and shifted to another routine such as the first example to execute and terminate the coasting control.

Alternatively, the estimation of the probability that the driver will require stronger deceleration at step S14 of the second example shown in FIG. 5 may also be made by the flowing procedures. According to a modification example, at step S14, it is determined whether or not an amount of braking operation of the driver is larger than a second operation amount B2. In this case, for example, the probability that the driver will require stronger deceleration is judged to be high if a depressing amount or a depressing angle of the brake pedal is larger than the second operation amount B2. By contrast, if the amount, of braking operation of the driver is smaller than the second operation amount B2, the probability that the driver will require stronger deceleration is judged to be low. According to the modification example, if the amount of braking operation has not yet exceeded the second operation amount B2 so that the answer of step S14 is NO, the routine advances to step S15 to commence or continue the coasting control. By contrast, if the amount of braking operation is larger than the second operation amount B2 so that the answer of step S14 is YES, the routine advances to step S16 to execute the standby control for terminating the coasting control.

Specifically, as indicated in the time chart shown in FIG. 6(b), the braking operation is commenced at point t0, and the standby control is executed at point t21 when the amount of braking operation reaches the second operation amount B2. Then, the amount of the braking operation reaches a first operation amount B1 at t22, and the coasting control is terminated and an engine braking force is applied to the vehicle Ve. Thus, the probability that the driver will require stronger deceleration is assumed to be increased when the amount of braking operation reaches the second operation amount B2, and consequently the probability that the coasting control will be terminated soon is assumed to be high. In this situation, therefore, the standby control for terminating the coasting control smoothly is carried out. To this end, the first operation amount B1 and the second operation amount B2 are determined based on a simulation result or an experiment, and according to the modification example, the first operation amount B1 is set approximately to 30%. The second operation amount B2 is set to be 10% smaller than the first operation amount B1, that is, approximately to 20%.

The estimation of the probability that the driver will require stronger deceleration at step S14 may also be determined based on a road gradient. In this case, at step S14, it is determined whether or not a downgrade of a slope is steeper than a second gradient C2. If the downgrade of the slope is steeper than the second gradient C2, the probability that the driver will require stronger deceleration is judged to be high or to be increased. By contrasts if the downgrade of the slope is not steeper than the second gradient C2 or the vehicle climbs on an upgrade, the probability that the driver will require stronger deceleration is judged to be low or not to be increased. In this case, if the downgrade of the slope is not steeper than the second gradient C2 or the vehicle climbs on an upgrade so that the answer of step S14 is NO, the routine advances to step S15 to commence or continue the coasting control. By contrast, if the downgrade of the slope is steeper than the second gradient C2 so that the answer of step S14 is YES, the routine advances to step S16 to carry out the standby control for terminating the coasting control.

Specifically, as indicated in the time chart shown in FIG. 6(c), the standby control is executed at point t31 when the downgrade of the slope reaches the second gradient C2. Then, the downgrade of the slope reaches a first gradient C1 at t32, and the coasting control is terminated and an engine braking force is applied to the vehicle Ve. Thus, the probability that the driver will require stronger deceleration is assumed to be increased when the downgrade of the slope reaches the second gradient C2, and consequently the probability that the coasting control will be terminated soon is assumed to be high. In this situation, therefore, the standby control for terminating the coasting control smoothly is carried out. To this end, the first gradient C1 and the second gradient C2 are determined based on a simulation result or an experiment, and according to the modification example, the first gradient C1 is set approximately to 5%. The second gradient C2 is set to be 1% smaller than the first gradient C1, that is, approximately to 4%.

The estimation of the probability that the driver will require stronger deceleration, at step S14 may also be determined based on an increasing amount of the vehicle speed. In this case, at step S14, it is determined whether or not an increasing amount of vehicle speed is larger than a second increasing amount V2. If the increasing amount of the vehicle speed is larger than the second increasing amount V2, the probability that the driver will require stronger deceleration is judged to be high or to be increased. By contrast, if the increasing amount of the vehicle speed is smaller than the second increasing amount V2, the probability that the driver will require stronger deceleration is judged to be low or not to be increased. In this case, if the increasing amount of the vehicle speed is smaller than the second increasing amount V2 so that the answer of step S14 is NO, the routine advances to step S15 to commence or continue the coasting control. By contrast, if the increasing amount of the vehicle speed is larger than the second increasing amount V2 so that, the answer of step S14 is YES, the routine advances to step S16 to carry out the standby control for terminating the coasting control.

Specifically, as indicated in the time chart, shown in FIG. 6(d), the standby control is executed at point t41 when the increasing amount of the vehicle speed reaches the second Increasing amount V2. Then, the increasing amount of the vehicle speed reaches a first increasing amount V1 at t42, and the coasting control is terminated and an engine braking force is applied to the vehicle Ve. Thus, the probability that the driver will require stronger deceleration is assumed to be increased when the vehicle speed, reaches the second increasing amount V2, and consequently the probability that the coasting control will be terminated soon is assumed to be high. In this situation, therefore, the standby control for terminating the coasting control smoothly is carried out. To this end, the first increasing amount V1 and the second increasing amount V2 are determined based on a simulation result or an experiment, and according to the modification example, the first increasing amount V1 is set approximately to 5 km/h. The second increasing amount V2 is set to be 2 km/h smaller than the first increasing amount V1, that is, approximately to 3 km/h.

The estimation of the probability that the driver will require stronger deceleration at step S14 may also be determined based on a distance from a forerunning vehicle. In this case, at step S14, it is determined whether or not a distance from the forerunning vehicle is shorter than a second distance L2. If the distance from the forerunning vehicle is shorter than, the second distance L2, the probability that the driver will require stronger deceleration is judged to be high or to be increased. By contrast, if the distance from the forerunning vehicle is further than the second distance L2, the probability that the driver will require stronger deceleration is judged to be low or not to be increased. In this case, if the distance from the forerunning vehicle is shorter than the second distance L2 so that the answer of step S14 is NO, the routine advances to step S15 to commence or continue the coasting control. By contrast, if the distance from the forerunning vehicle is further than the second distance L2 so that the answer of step S14 is YES, the routine advances to step S16 to carry out the standby control for terminating the coasting control.

Specifically, as indicated in the time chart shown in FIG. 6(e), the standby control is executed at point t51 when the distance from the forerunning vehicle is reduced to be shorter than the second distance L2. Then, the distance from the forerunning vehicle is reduced to be shorter than a first distance L1, at t52, and the coasting control is terminated and an engine braking force is applied to the vehicle Ve. Thus, the probability that the driver will require stronger deceleration is assumed to be increased when the distance from the forerunning vehicle is reduced to be shorter than the second distance L2, and consequently the probability that the coasting control will be terminated soon is assumed to be high. In this situation, therefore, the standby control for terminating the coasting control smoothly is carried out. To this end, the first distance L1 and the second distance L2 are determined based on a simulation result or an experiment. Optionally, the first distance L1 and the second distance L2 may be altered depending on a vehicle speed. According to the modification example, fee first distance L1 is set approximately to 50 m given that the vehicle speed is 80 km/h. The second distance L2 is set to be 5 m longer than the first distance L1, that is, approximately to 55 m.

Thus, according to the second example, the probability that the deceleration demand of the driver is high or will, be increased is estimated based on duration of braking operation, an amount of braking operation, a road gradient, an increasing amount of the vehicle speed, and a distance from the forerunning vehicle. Therefore, the deceleration demand of the driver can be estimated accurately so that, the standby control for engaging the clutch device 7 can be commenced, preliminary based on the estimation result. For this reason, the casting control can be commenced and terminated smoothly.

As explained in the description of the first and the second examples, when the operating amount of the accelerator is reduced to be smaller than the reference value A under the condition that the vehicle speed is higher than reference speed α, the clutch device 7 is brought into disengagement to disconnect the engine 1 from the drive wheels 2. Consequently, the coasting control of the vehicle Ve is allowed to be carried out to improve fuel economy by extending a cruising distance of the vehicle Ve while operating the engine 1 free from load.

During execution of the coasting control, the vehicle control system of the present invention estimates the deceleration demand of the driver based on the vehicle speed and the duration or the amount of braking operation. For example, the control system determines a fact that the deceleration demand of the driver is strong if the duration of the braking operation is long or the amount of the braking operation is large under the condition that the vehicle speed falls within the middle or high speed range. In this case, if the estimated deceleration demand of the driver is strong and it is necessary to decelerate the vehicle Ve continuously, the clutch device 7 is brought into engagement to terminate the coasting control. Consequently, the engine 1 is connected to the drive wheels 2 so that the braking torque derived from a load and resistance of the power transmission route is applied to the drive wheels. Therefore, the vehicle Ve can be decelerated properly in line with the deceleration demand or intension of the driver so that drivability of the vehicle Ve can be improved.

By contrast, if the duration of the braking operation is short or the amount of the braking operation is small under the condition that the vehicle speed falls within the middle or high speed range, the control system determines a fact that the deceleration demand of the driver is not so strong. In this case, it is not necessary to apply an engine braking force to the vehicle Ve by terminating the coasting control. Therefore, the coasting control is continued to improve fuel economy of the vehicle Ve.

Thus, according to the present invention, the vehicle control system determines to continue or to terminate the coasting control taking account of the vehicle speed. Specifically, if the braking operation is carried out under the condition that the vehicle Ve runs at a speed lower than the middle or high speed range, the coasting control is terminated Immediately. In the low speed range, the braking operation is carried out most likely to decelerate the vehicle Ve significantly or to stop the vehicle. Therefore, the coasting control can be terminated properly by thus determining the termination of the coasting control depending on the vehicle speed.

Thus, the vehicle control system of the present invention is further configured to estimate a probability that the deceleration demand of the driver will be increased or the deceleration demand is judged to be strong. If the probability that the deceleration demand will be increased is high, a speed difference between the rotary members of the clutch device 7 is reduced. That is, according to the present invention, the clutch device 7 is prepared to be engaged prior to terminating the coasting control. Therefore, engagement shocks of the clutch device 7 can be reduced on the occasion of terminating the coasting control so that drivability of the vehicle Ve can be improved.

Here will be briefly explained a relation between the foregoing examples and the present invention. The functional means of step S3 serves as the "execution means" of the invention, the functional means of steps S2, S4, S6, S7, S12, and S14 serve as the "determination means" of the invention, functional means of steps S3 and S13 serve as the "termination means" of the invention, and the functional means of step S16 serves as the "standby means" of the invention.

The invention claimed is:

1. A vehicle control system, that is applied to a vehicle having a clutch device adapted to selectively connect and disconnect a power transmission route between a prime mover and drive wheels, and that is configured to disconnect the power transmission route during running to allow the vehicle to coast, comprising a controller that is configured to:
   detect a vehicle speed;
   detect an operation of an accelerator by a driver;
   detect a braking operation of the driver;
   execute a coasting control when an operating amount of the accelerator is reduced to be smaller than a predetermined value during running, by bringing the clutch device into disengagement to disconnect the power transmission route so as to allow the vehicle to coast;
   determine whether or not a deceleration demand of the driver is larger than a predetermined value during execution of the coasting control based on the vehicle speed and the braking operation;
   determine a fact that the deceleration demand is strong if the deceleration demand is larger than the predetermined value, and terminate the coasting control by bringing the clutch device into engagement to connect the power transmission route;
   determine a probability that the deceleration demand is judged to be strong based on the vehicle speed and the braking operation; and
   reduce a speed difference between a rotary member of the clutch device of the prime mover side and a rotary member of the clutch device of the drive wheel side prior to terminating the coasting control, by controlling a speed of the prime mover.

2. The vehicle control system as claimed in claim 1, wherein the controller is further configured to:
   determine the fact that the deceleration demand is strong when the braking operation is continued longer than a first operate time under a condition that the vehicle speed is higher than a reference speed; and
   determine the fact that the probability is high when the braking operation is continued longer than a second operate time that is shorter than the first operate time.

3. The vehicle control system as claimed in claim 2, wherein the controller is further configured to terminate the coasting control if the vehicle speed is lower than the reference speed when the braking operation is carried out.

4. The vehicle control system as claimed in claim 1, wherein the controller is further configured to:
   determine the fact that the deceleration demand is strong when an amount of the braking operation is larger than a first operation amount under a condition that the vehicle speed is higher than a reference speed; and
   determine the fact that the probability is high when the amount of the braking operation is larger than a second operation amount that is smaller than the first operation amount.

5. The vehicle control system as claimed in claim 1, wherein the controller is further configured to:
   detect a road gradient; and
   determine the fact that the deceleration demand is strong if a downgrade of a road on which the vehicle is running at a speed higher than a reference speed is steeper than a first gradient, and
   determine the fact that the probability is high if the downgrade of the road on which the vehicle is running is steeper than a second gradient that is milder than the first gradient.

6. The vehicle control system as claimed in claim 5, wherein the controller is further configured to terminate the coasting control if the vehicle speed is lower than the reference speed when the braking operation is carried out.

7. The vehicle control system as claimed in claim 1, wherein the controller is further configured to:
   detect an increasing amount of the vehicle speed; and
   determine the fact that the deceleration demand is strong if an increasing amount of a speed of the vehicle running at a speed higher than a reference speed exceeds a first increasing amount, and determine the fact that the probability is high if the increasing amount of the vehicle speed exceeds a second increasing amount that is smaller than the first increasing amount.

8. The vehicle control system as claimed in claim 7, wherein the controller is further configured to terminate the coasting control if the vehicle speed is lower than the reference speed when the braking operation is carried out.

9. The vehicle control system as claimed in claim 1, wherein the controller is further configured to:
   detect a distance between the vehicle and a forerunning vehicle; and
   determine the fact that the deceleration demand is strong if the distance of the vehicle running at a speed higher than a reference speed is reduced to be shorter than a first distance, and
   determine the fact that the probability is high if the distance is reduced to be shorter than a second distance that is shorter than the first distance.

10. The vehicle control system as claimed in claim 1, wherein the controller further configured to terminate the coasting control if the vehicle speed is lower than a reference speed when the braking operation is carried out.

* * * * *